United States Patent [19]

Kramer et al.

[11] Patent Number: 5,690,279

[45] Date of Patent: Nov. 25, 1997

[54] THERMAL RELIEF SLOT IN SHEET METAL

[75] Inventors: George J. Kramer, Jupiter; Paul A. Smith, Jr., Palm Beach Gardens, both of Fla.; Kenneth W. Froemming, Indianapolis, Ind.

[73] Assignee: United Technologies Corporation, Hartford, Conn.

[21] Appl. No.: 564,997

[22] Filed: Nov. 30, 1995

[51] Int. Cl.[6] ............................................. B64D 33/04
[52] U.S. Cl. .............................. 239/127.3; 60/261; 60/271
[58] Field of Search ............................ 239/127.1, 127.3; 60/261, 262, 271; 29/888.3

[56] References Cited

U.S. PATENT DOCUMENTS

| | | | |
|---|---|---|---|
| 3,584,972 | 6/1971 | Bratkovich et al. | 416/229 |
| 3,698,834 | 10/1972 | Meginnis | 416/96 |
| 3,732,031 | 5/1973 | Bowling et al. | 416/97 |
| 5,077,969 | 1/1992 | Liang et al. | 60/261 |
| 5,239,823 | 8/1993 | Sims | 60/271 |
| 5,388,765 | 2/1995 | Hill et al. | 239/127.3 |

*Primary Examiner*—Andres Kashnikow
*Assistant Examiner*—Steven J. Ganey
*Attorney, Agent, or Firm*—Norman Friedland

[57] ABSTRACT

A thermal relief slot is formed by including a lateral slot in each of three overlying sheet metal sheets with the upper and lower slots being in overlying position and the middle slot being axially spaced therefrom and the three sheets being bonded into an integral sheet metal sheet assembly except for the area extending over the relief slots. The edge of the upper and/or lower outer edges of adjacent the relief slots may be chamfered to prevent fraying of the edges. A two sheet assembly includes the relief slots axially spaced and two sheet metal sheets are bonded except for the area including and extending between the two relief slots.

19 Claims, 4 Drawing Sheets

THERMAL RELIEF SLOT IN SHEET METAL

This invention was made under a United States Government contract and the Government has an interest herein.

TECHNICAL FIELD

This invention relates to air cooled sheet metal liners and/or seals and particularly to thermal relief slots formed in the sheet metal liner which is subjected to extreme temperatures and large temperature gradients and the construction thereof.

BACKGROUND ART

As is well known in the heat transfer technology certain metallic and non-metallic components utilized in machinery, power plants and the like are subjected to extreme temperatures and in order for the materials to survive in these hostile environments it is necessary to provide means to cool these components. For example, the thrust vectoring nozzle of a gas turbine engine powering aircraft that utilizes augmentors subject these components to temperatures that exceed 3500 degrees Fahrenheit. As one skilled in this art will appreciate it is imperative that these components utilize sophisticated cooling techniques in order to cool these parts so as to maintain their structural integrity. While the prior art is replete with cooling schemes, examples of cooling schemes which exemplifies the prior art cooling schemes, are disclosed in U.S. Pat. No. 5,255,849 granted to Mayer et al on Oct. 26, 1993 entitled "Cooling Air Transfer Apparatus For Aircraft Gas Turbine Engine Exhaust Nozzles", U.S. Pat. No. 5,335,489 granted to Thayer et al on Aug. 9, 1994 entitled "Gas Turbine Vectoring Exhaust Nozzle" and U.S. Pat. No. 4,690,329 granted to Madden on Sep. 1, 1987 entitled "Exhaust Nozzle Coupled With Exhaust Reverser Door". This invention is particularly concerned with the construction of sheet metal components that may be utilized as liners or seals that are subjected to large temperature gradients where thermal stresses could cause injury or destruction to these components. This invention contemplates the utilization of judiciously located thermal relief slots that allow the sheet metal to become thermally compliant without exposing the coolant (which is cooling air in this particular application) from leaking out without any restraint. The thermal relief slot of this invention is discretely formed to avoid stress concentration locations and to provide a circuitous and tortuous path for the escape of the coolant thereby holding the coolant losses to a minimum so as not to adversely impact the engine's performance. In one embodiment an especially designed dome formed in the sheet metal with these thermal relief slots serves to provide means for transmitting cooling air to the liner adjacent the gas path of the engine. Of particular importance is the fact that the thermal slot feature is self-contained inside the sheet metal assembly and consequently, once assembled, the sheet metal assembly does not interfere with mating parts when installed in the particular installation where it is to be ultimately utilized.

SUMMARY OF THE INVENTION

An object of this invention to provide an improved liner and/or seal that contains means for cooling and a thermal relief slot that exhibits a large restraint to the leakage of coolant. This invention has particular utility in aircraft engines where it is necessary to cool the liner/seal where these components are exposed to extreme temperature gradients and pose an extreme thermal stress problem.

A feature of this invention is that the relief slot is provided in three planar sheet metal components that are formed with cooling passages and is tongue and groove fitted to form a tortuous leakage path for the coolant.

Another feature of this invention is the construction of the sheet metal assembly which is formed from at least three sheet metal components which are individually machined and bonded together to form the cooling passages and thermal relief slots whereby the thermal relief slot is self-contained inside the sheet metal assembly and avoids interfering with mating parts when assembled in the power plant or machinery where it is utilized.

Another feature of this invention is that the edges of the material forming the thermal relief slot may be chamfered or cut back to prevent fraying of the edges during operation.

Another feature of this invention is a sheet metal assembly made from two overlapping sheets of sheet metal with a thermal relief slot extending partially in the lateral direction and ship lapped to form a tortious leakage path.

The foregoing and other features of the present invention will become more apparent from the following description and accompanying drawings.

DETAILED DESCRIPTION OF THE PREFERRED EMBODIMENT

Figure 1:
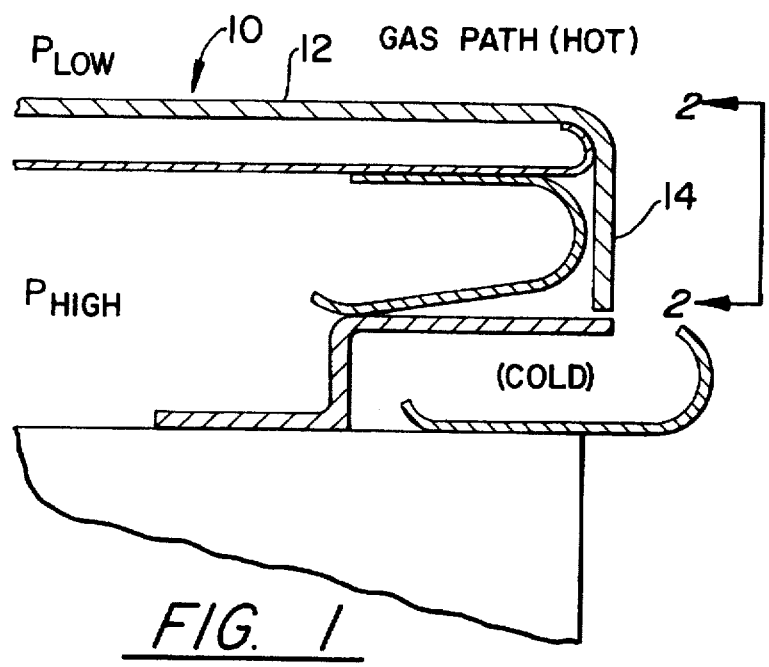
FIG. 1 is a partial view in schematic illustrating an example of an assembly where this invention is utilized.
Figure 2:
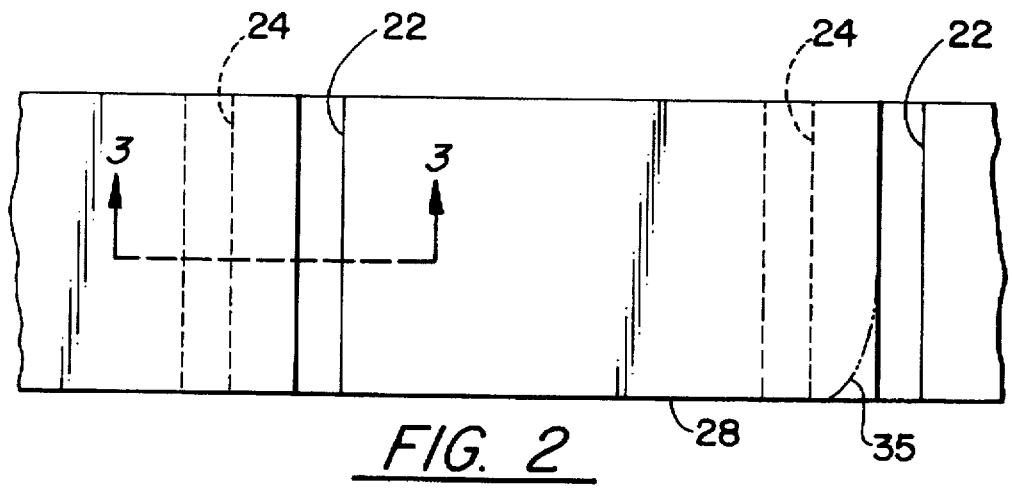
FIG. 2 is an enlarged end view in schematic taken along lines 2—2 of FIG. 1 illustrating the thermal relief slots of this invention.
Figure 3:
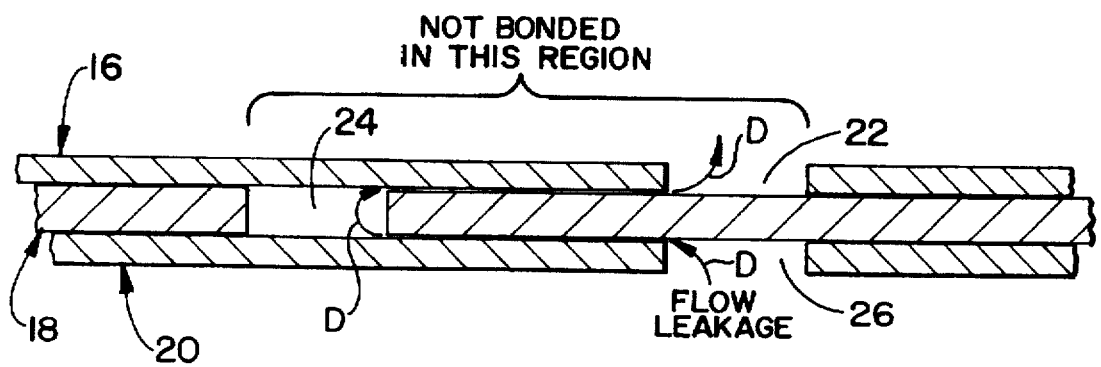
FIG. 3 is a partial view in section taken along lines 3—3 of FIG. 2.
Figure 4:
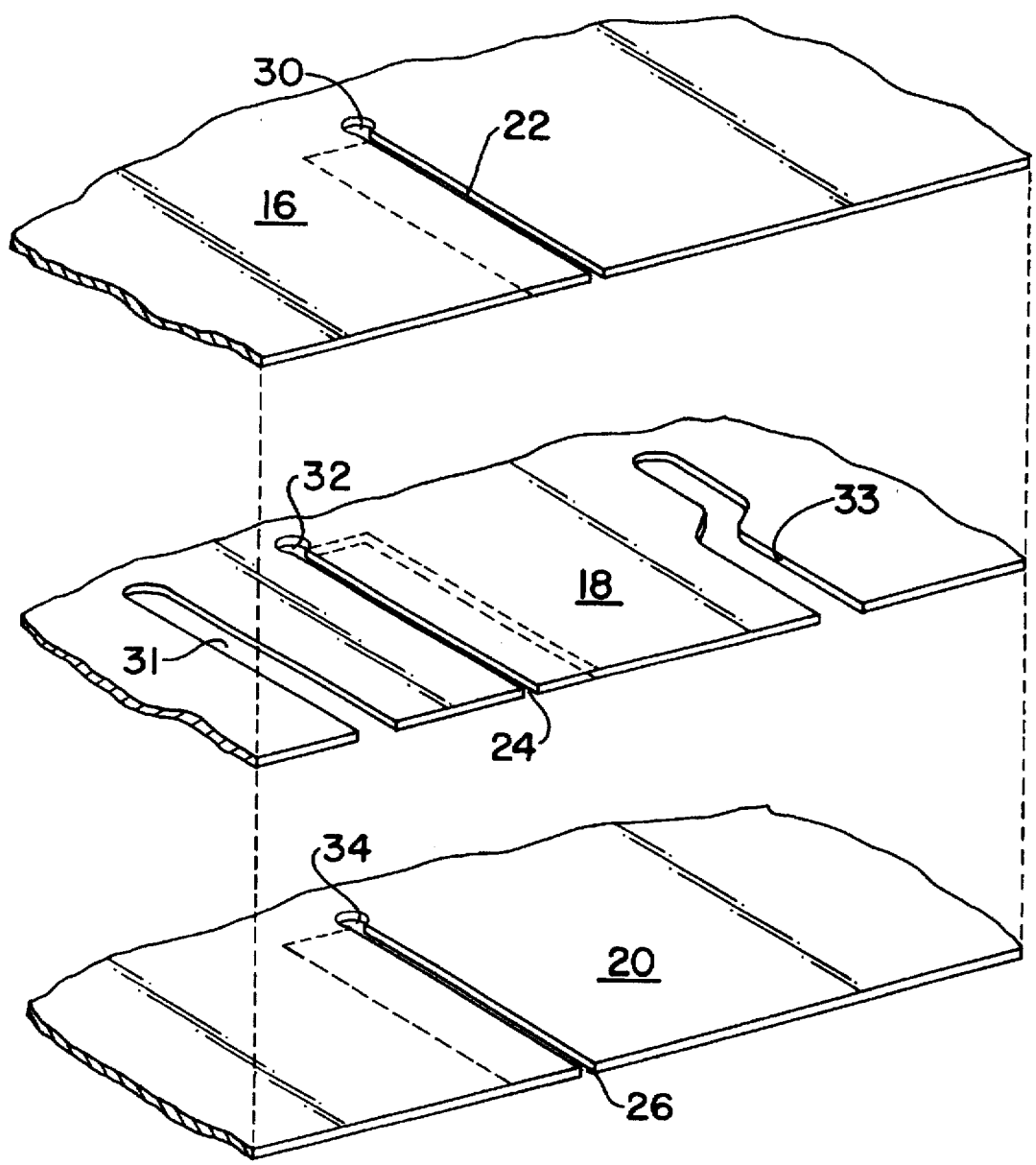
FIG. 4 is an exploded view of the sheet metal sheets forming the assembled sheet metal sheet with the thermal relief slot.

While the preferred embodiment of this invention discloses the details of this invention utilized in a gas turbine engine environment, it should be understood by those skilled in this art that this invention has utility in any environment where cooled sheet metal parts are utilized.

Referring next to FIGS. 1-4, the invention is best shown as being employed in a sheet metal assembly that is utilized in the nozzle liner and seal of a gas turbine engine (not shown). The sheet metal assembly generally indicated by reference numeral 10 has a top surface 12 exposed to the hot gases of the engine's exhaust gases and is a portion of a nozzle flap that is moveable. Sheet metal assembly 10 has a depending portion 14 that has the upper portion exposed to the hot gases of the engine's exhaust and to cooling air that is significantly cooler than the hot gases. This obviously exposes this portion 14 of sheet metal assembly 10 to extreme thermal gradients which obviously requires cooling means for obviating the distortion and life limiting problems that are occasioned by this hostile environment. As noted in FIGS. 2, 3 and 4 the sheet metal assembly 10 is comprised of three separate planar sheets of sheet metal. The upper sheet metal 16, the middle sheet metal 18 and the lower sheet metal 20. Thermal relief slots 22, 24 and 26 are cut into the sheet metal sheets 16, 18 and 20 respectively and extend from the front edge 28 a partial distance extending laterally relative to the longitudinal dimension of the respective sheet metal sheets. Key holes 30, 32, and 34 are cut into the end portion of each of the respective thermal relief slots 22, 24 and 26 and are provided in order to eliminate sharp corners to minimize stress concentration. The L-shaped dash lines A, B and C in the respective plates indicate the areas where no bonding takes place. This allows this portion of the sheet metal of each of the sheets 16, 18 and 20 some degree of flexibility to accommodate the expansion and contraction of the metal exposed to the thermal gradients.

Also shown for illustration purposes with respect to these Figures are cut outs 31 and 33 which are slots formed for defining passageways for flowing cooling air for cooling this portion of the sheet metal assembly to maintain its structural integrity. As will be shown in further detail these passageways are integrally formed in the sheet metal assembly as is the thermal relief slots and these slots may be formed by any known machining method and preferably laser cutting techniques. The metal of these configurations may be nickel or an alloy thereof but the invention is applicable to other metals. The three sheets are bonded together by any well known method such as diffusion bonding or brazing noting that the areas adjacent the relief slot are left unbonded.

As is apparent from the foregoing, the upper plate 16 is exposed to the hotter temperature and the lower plate 20 is exposed to the lower temperature. Since the upper surface is adjacent a lower pressure area the flow of the cooler fluid will flow from the higher pressure to the lower pressure. In the actual environment the cooling air leaks to the gas path and in heretofore known designs the flow of leakage air was unrestrained with a consequential loss of valuable cooling air which ultimately becomes a engine performance deficit. As is apparent from viewing FIG. 3 the leakage flow represented by arrows D in accordance with this invention take a labyrinth path or tortious route to flow from the cold side to the hot side. Thus the cool air flows from the slot 26 between the plates 20 and 18, into slot 24 and then between the plates 18 and 16 and into slot 22 which is exposed to the gas path.

The edge of the upper plate 16 and lower plate 20 adjacent the slots 22 and 26 may be chamfered or cut back in the direction of the unbonded area as depicted by the phantom line 35. This option is used to prevent fraying of the edge during operation when these parts are thermally expanding and contracting. In the case of the sheet metal assembly being utilized in the engine's nozzle the upper plate or the hottest plate exposed to the gas path may be treated this way in order to reduce or eliminate gas path metal erosion. It will be appreciated that the cut back will not adversely affect the function of the thermal slot.

Figure 5:
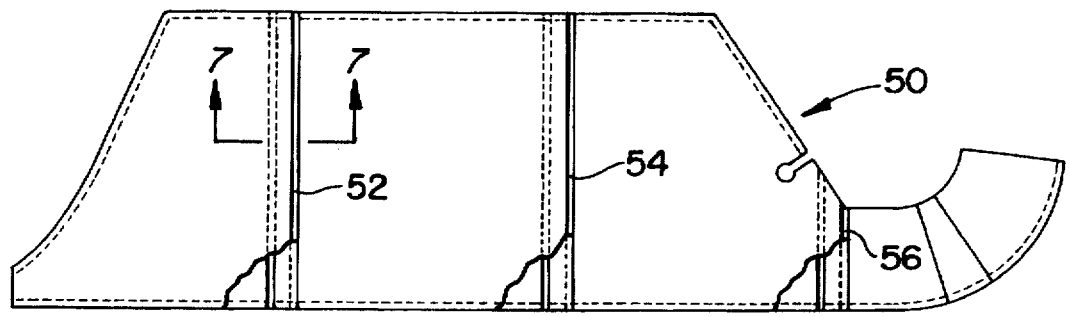
FIG. 5 is a plan view of a complex sheet metal component with compound angles utilizing this invention in the vectoring nozzle of a turbine type power plant.
Figure 6:
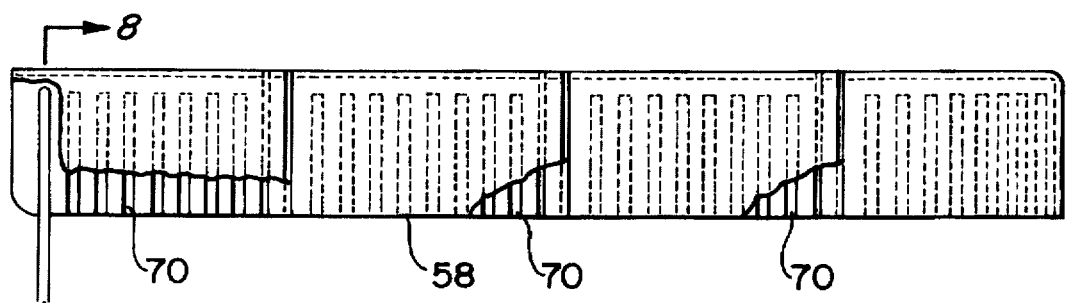
FIG. 6 is a front view of the structured depicted in FIG. 5.
Figure 8:
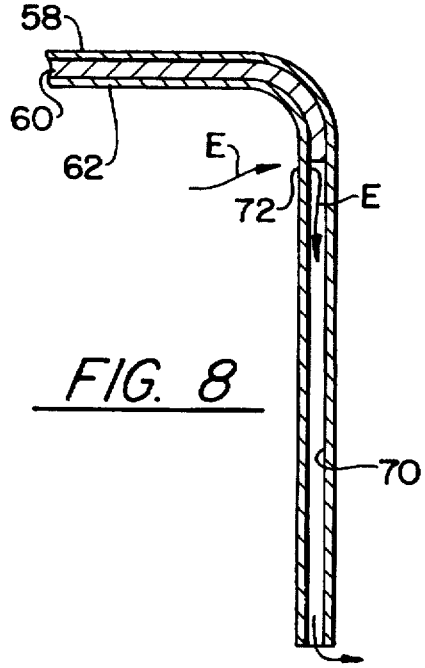
FIG. 8 is a sectional view taken along lines 8—8 of FIG. 6.
Figure 7:
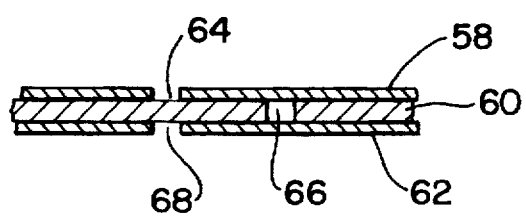
FIG. 7 is a sectional view taken along lines 7—7 of FIG. 5.

FIGS. 5–8 illustrate a complex assembled sheet metal component generally indicated by reference numeral 50 utilizing this invention. As shown in FIG. 5 three thermal relief slot portions 52, 54, and 56 are formed in the depending portion 58 of the sheet metal assembly 50 and for the sake of convenience and simplicity only one thermal relief slot portion will be described herein. Each of the thermal relief slot portions are identical as the one described in connection with FIGS. 1–4. The sheet metal assembly 50 is comprised of three sheet metal planar plates or sheets 58, 60 and 62 with the thermal relief slots 64, 66 and 68 formed therein as is the plurality of spaced cooling slots 70. The sheets 58, 60 and 62 are bonded together leaving the area adjacent each of the slots 64, 66 and 68 unbonded. FIG. 8 illustrates the flow of cooling air in the respective cooling passages 70. Cooling air is admitted through aperture 72 and flows through passage 70 as depicted by arrows and discharged at the end to passage 70.

Figure 9:
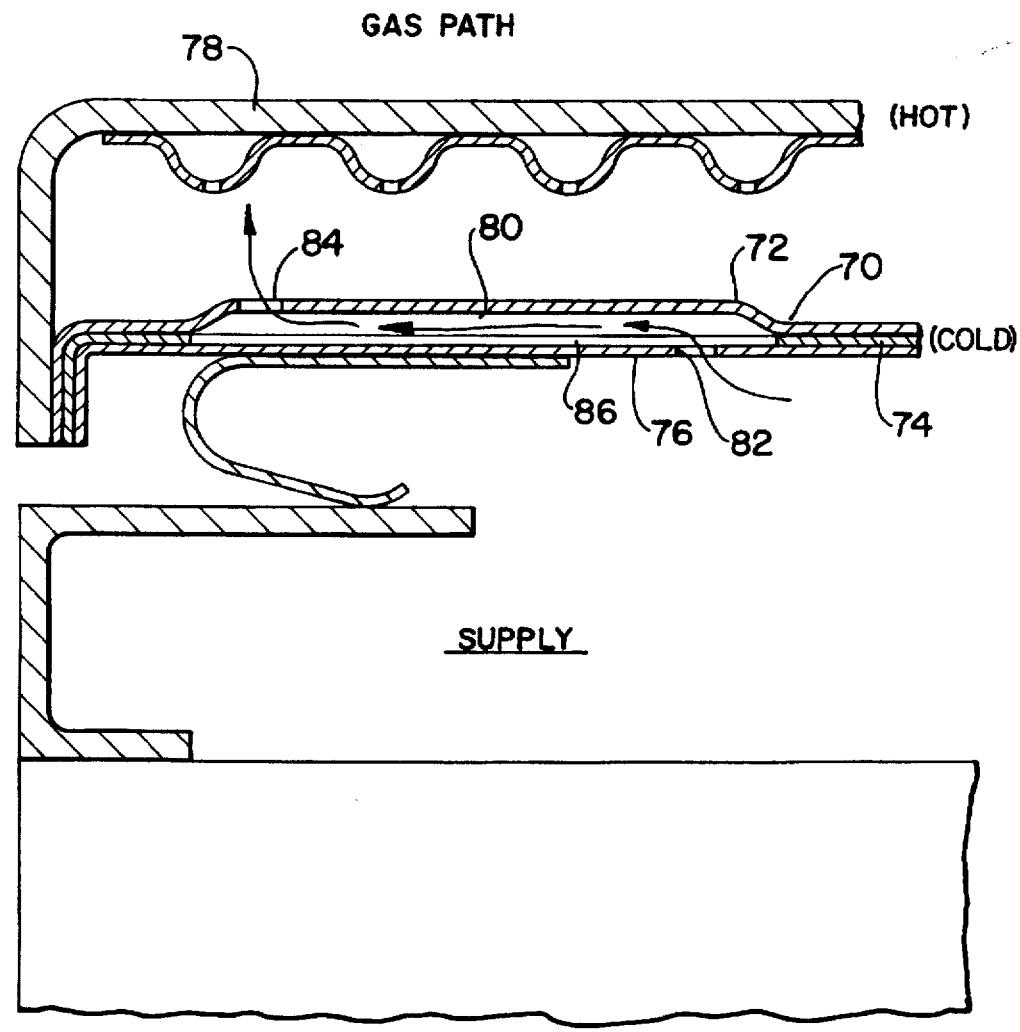
FIG. 9 is a schematic illustrating the invention when the sheet metal assembly is utilized in an environment necessitating the transfer of cooling air from one location to another through the sheet metal assembly.

FIG. 9 exemplifies a modification of the sheet metal assembly when it is desirable to transfer cooling air from one location to another. In this instance the sheet metal assembly 70, consisting of the three plates 72, 74 and 76 identical to those described herein above, is disposed between the cold air supply and the liner 78 that is exposed to the gas path. A portion of sheet 72 is domed to form a pocket 80. The cooler air would enter the sheet metal assembly through the aperture 82, flow into the cooling passage 86 cut into the plate 74 and into the passage 80 and out of discharge hole 84 where it is directed to impinge on the back surface of liner 78.

Figure 10:
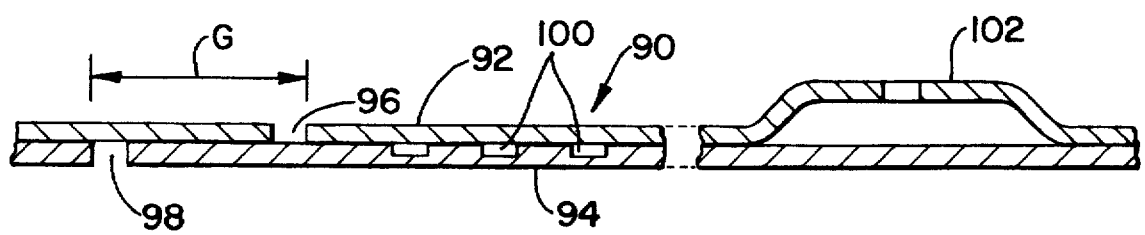
FIG. 10 is a view in schematic exemplifying another embodiment of this invention.

FIG. 10 is another embodiment of this invention where the sheet metal assembly 90 comprises two planar sheets 92 and 94. In this instance thermal relief slots 96 and 98 are formed in plates 92 and 94 and cooling slots 100 are cut into the upper surface of plate 94 (or optionally cut into the lower surface of plate 92). The joints are ship-lapped instead of the tongue and groove fit shown in the other versions. Dome 102 may optionally be formed to transfer coolant from one location to another as was shown in the other versions of the sheet metal assemblies. The sheet metal assembly 90 functions identical to the other sheet metal assemblies and the plates 92 and 94 are bonded together except for the area G adjacent to slots 96 and 98 and the thermal relief slots likewise form a tortuous path for the leakage of coolant.

What has been shown is a relatively easy method of providing thermal relief slots in a sheet metal assembly that has particular utility in the nozzle portion of a gas turbine engine. The passages and slots are preformed so as to allow the production of these sheets in a one-piece thermally compliant sheet metal assembly which minimizes the leakage of coolant. In one embodiment means are provided to transfer fluid from one location to another for ease of design for given applications. Means are also provided to relieve high stress concentration points and fraying and resistance to erosion to ensure the life of the component.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. A sheet metal assembly being exposed to thermal stresses including a top sheet metal sheet, a bottom sheet metal sheet and a middle sheet metal sheet sandwiched between said top sheet and said bottom sheet, at lease one relief slot extending laterally into each of said top sheet, said middle sheet and said bottom sheet, the top relief slot and bottom relief slot being in vertical alignment, the relief slot in said middle sheet being axially spaced therefrom, said top sheet, said middle sheet and said bottom sheet being bonded to each other except in the area of each of the sheet metal sheets extending from the relief slot in said middle sheet and the relief slot in said top sheet and said bottom sheet whereby the portion of sheet metal adjacent each of said relief slots is capable of flexing relative to the remaining portion of the sheet metal and defining a labyrinth leakage path from said bottom sheet to said top sheet.

2. A sheet metal assembly as claimed in claim 1 including key holes formed in the end of each of said thermal relief slots.

3. A sheet metal assembly as claimed in claim 1 including at least one cooling slot extending laterally into said middle sheet and defining with said upper sheet and said lower sheet a cooling passage and an inlet passage formed in said lower sheet for leading cooling air into said cooling passage.

4. A sheet metal assembly as claimed in claim 1 including a plurality of longitudinal spaced slots partially extending laterally in said middle sheet and defining with said top sheet and said bottom sheet a plurality of cooling passages and a plurality of apertures formed in said lower sheet for leading cooling air into each of said cooling passages.

5. A sheet metal assembly as claimed in claim 4 where said upper sheet is exposed to a relatively high temperature and said lower sheet exposed to a lower temperature.

6. A sheet metal assembly as claimed in claim 1 including a dome formed in a portion of said upper sheet whereby fluid is transferred from said lower sheet to said dome and an outlet formed in said dome for discharging the fluid received therein whereby fluid is capable of being transferred through the sheet metal assembly.

7. A sheet metal assembly as claim in claim 1 including a chamfer formed on the outer edge of the portion of sheet metal in the upper layer that is adjacent the thermal relief slot.

8. A sheet metal assembly being exposed to thermal stresses including a top sheet metal sheet and a bottom sheet metal, at lease one relief slots extending laterally into each of said top sheet and said bottom sheet, the top relief slot being axially spaced therefrom, said top sheet and said bottom sheet being bonded to each other except in the area of each of the sheet metal sheets extending from the relief slot in said top sheet to the relief slot in said bottom sheet whereby the portion of sheet metal adjacent each of said relief slots is capable of flexing relative to the remaining portion of the sheet metal and defining a labyrinth leakage path from said bottom sheet to said top sheet.

9. A sheet metal assembly as claimed in claim 8 including key holes formed in the end of each of said thermal relief slots.

10. A sheet metal assembly as claimed in claim 8 wherein said upper sheet includes a bottom surface, at least one cooling recess partially extending laterally into said bottom surface for defining with said bottom sheet a cooling passage and an inlet passage formed in said lower sheet for leading cooling air into said cooling passage.

11. A sheet metal assembly as claimed in claim 8 wherein said upper sheet includes a bottom surface, a plurality of longitudinal spaced recesses partially extending laterally in said bottom surface for defining with said bottom sheet a plurality of cooling passages and a plurality of apertures formed in said bottom sheet for leading cooling air into each of said cooling passages.

12. A sheet metal assembly as claimed in claim 8 where said upper sheet is exposed to a relatively high temperature and said lower sheet exposed to a lower temperature.

13. A sheet metal assembly as claimed in claim 8 including a dome formed in a portion of said upper sheet whereby fluid is transferred from said lower sheet to said dome and an outlet formed in said dome for discharging the fluid received therein whereby fluid is capable of being transferred through the sheet metal assembly.

14. A sheet metal assembly being exposed to thermal stresses forming a seal in a vectoring nozzle of a gas turbine engine including a top sheet metal sheet, a bottom sheet metal sheet and a middle sheet metal sheet sandwiched between said top sheet and said bottom sheet, said sheet metal assembly being angularly bent to form a sealing surface and a cooling portion, at least one relief slot extending laterally into each of said top sheet, said middle sheet and said bottom sheet of said cooling portion, the top relief slot and bottom relief slot being in vertical alignment, the relief slot in said middle sheet being axially spaced therefrom, said top sheet, said middle sheet and said bottom sheet being bonded to each other except in the area of each of the sheet metal sheets extending from the relief slot in said middle sheet and the relief slot in said top sheet and said bottom sheet whereby the portion of sheet metal adjacent each of said relief slots is capable of flexing relative to the remaining portion of the sheet metal and defining a labyrinth leakage path from said bottom sheet to said top sheet.

15. A sheet metal assembly as claimed in claim 14 including at least one cooling slot extending laterally into said middle sheet of said cooling portion and defining with said upper sheet and said lower sheet a cooling passage and an inlet passage formed in said lower sheet for leading cooling air into said cooling passage.

16. A sheet metal assembly as claimed in claim 15 where said upper sheet of said seal portion is exposed to a relatively high temperature and said cooling portion is exposed to a lower temperature.

17. A sheet metal assembly as claimed in claim 14 including a plurality of longitudinal spaced slots partially extending laterally in said middle sheet of said cooling portion and defining with said top sheet and said bottom sheet a plurality of cooling passages and a plurality of apertures formed in said lower sheet for leading cooling air into each of said cooling passages.

18. A sheet metal assembly as claimed in claim 14 including a liner exposed to relatively high temperatures, a dome formed in a portion of said upper sheet of said sealing portion whereby fluid is transferred from said lower sheet to said dome and an outlet formed in said dome for discharging the fluid received therein whereby fluid is capable of being impinged of said liner.

19. A sheet metal assembly as claim in claim 14 including a chamfer formed on the outer edge of the portion of sheet metal in the upper layer that is adjacent the thermal relief slot.

* * * * *